Patented July 10, 1951

2,560,331

UNITED STATES PATENT OFFICE 2,560,331

METHOD FOR PREVENTING CORROSION IN WELLS

Rudolph C. Buchan, Houston, Tex., assignor, by mesne assignments, to Standard Oil Development Company, Elizabeth, N. J., a corporation of Delaware No Drawing. Application July 30, 1948, Serial No. 41,705

5 Claims. (Cl. 166—21)

The present invention is directed to the production of fluids from underground formations. More particularly, the invention is directed to protecting the conduits and attendant equipment, through which fluids from subsurface formations are flowed and processed, from corrosion by materials occurring in or are introduced into fluids originating in subsurface formations.

In many oil, gas, and condensate fields, the production of fluids from subsurface formations is accompanied by extremely severe corrosion of the conduits and attendant equipment which comes into contact with the fluid mixture being produced. In many cases it is found that the fluid mixture is acidic in nature and comprises substantial amounts of carbon dioxide, a portion of which dissolves in water present to form carbonic acid. In addition to the carbon dioxide other materials which are present in the corrosive mixture may include organic acids, inorganic acids, inorganic salts and acidic sulfur compounds. These corrosive substances occur in or are introduced into the fluids originating in the subsurface formations. In some cases the corrosion occurs throughout the conduits and attendant equipment through which the fluids from the subsurface formations are flowed and processed. In other cases the corrosion is limited primarily to portions of the conduits near the surface of the wells and to the wellhead and attendant equipment. In all cases it has been necessary to make extensive replacements of equipment that has failed as a result of corrosion. This not only limits production, but is extremely expensive, particularly in those cases in which it is necessary to kill a high pressure well in order to make repairs and to replace corroded equipment. In addition to the high costs of making repairs to well equipment, there is a marked loss in revenues due to having a well off production and to the necessity of having to maintain additional wells and sources of supply to meet production requirements during periods in which a well is off production for repairs as a result of corrosion. Further, there is constant danger that a well will flow wild as a result of the failure of equipment due to corrosion. In cases of this kind, enormous losses are incurred.

It has been known for a long time that solutions of sodium silicate may be used in water in contact with ferrous metal surfaces to build up a concentration of silica in the water so that siliceous films form and give corrosion protection to the ferrous metal surfaces. In such prior art uses, the silicate concentration in the water has been less than about 100 parts per million and frequently as low as 10 parts per million. However, sodium silicate employed in this manner in coating oil well tubing has resulted in failure primarily because injection has been made rather continuously at one point for a long period of time. Thus, a thick scale has built up near the point of injection and this scale did not extend to an area other than that adjacent the point of injection. Thus, only a very small portion of the tubing was protected. This method of injection was disadvantageous because the silicate frequently built up to a point where the area of flow of the injection conduit and the area of flow of the tubing were frequently reduced to a point where the method became inoperable.

It has also been proposed to employ solid sodium silicate in oil wells by dropping sticks or coarse granules of the sodium silicate into the tubing of a well in the hope that the sodium silicate would dissolve in the water present in the well and thus distribute itself onto the steel surfaces exposed to attack by corrosive solutions. This method is also disadvantageous in that a large quantity of solid material must be added frequently to replace the chemical as it is being continuously consumed.

It is the main object of the present invention to provide a method whereby corrosion is substantially eliminated or inhibited in the conduits and attendant equipment through which fluids from subsurface formations are flowed and processed.

In accordance with the present invention, corrosion of ferrous metal surfaces in oil or gas wells and the like is inhibited or substantially eliminated by shutting down the well and adding to the corrosive solutions in the well a solution of an alkali metal silicate which is allowed to stand in contact with the exposed ferrous metal surfaces for a time in the range from about 30 minutes to about 10 hours with a preferred time of contact from about 1 to 5 hours.

The alkali metal silicate is preferably sodium silicate. Sodium silicate is to be preferred due to its cheapness and availability, but potassium silicate and lithium silicate will work as effectively as the preferred material. The alkali metal silicate is preferably employed in a concentrated solution. For example, one or more barrels of concentrated sodium silicate solution and an equivalent amount of water may be mixed and injected into the closed-in well and allowed to stand in contact with exposed ferrous metal surfaces to give the effective protection.

In practicing the method of the present invention, a concentrated sodium silicate solution, such as one containing 30% by weight of sodium silicate in water, is made up. The oil or gas well, as the case may be, may be shut in and the sodium silicate solution injected into the well at a pressure sufficient to force it into the tubing in the shut-in well. The shut-in well will also contain the corrosive solution. For example, in a condensate well, the corrosive solution may comprise hydrocarbon, water, carbon dioxide, hydrogen sulfide, organic acids, inorganic acids, salts, and acidic sulfur compounds. It is postulated that the action of the sodium silicate employed in the present invention is first to act as a scouring agent to remove corrosion products, which had formed prior to the practice of the present invention, and grease and oil films. It is postulated that the sodium silicate solution then wets the exposed ferrous metal surfaces, following which the corrosive solution, if of an acidic nature, reacts with the sodium silicate solution to cause a scale of silicic acid to form on the exposed ferrous metal surfaces. If the corrosion is due to alkaline media, for example, if calcium salts are present, a layer of calcium silicate may build up on the exposed ferrous metal surfaces and thus prevent attack by the corrosive media.

The amount of alkali metal silicate solution employed in the practice of the present invention may vary depending on the depth of the well to be treated. For example, in a well 10,000 feet deep, it has been found that 50 to 60 gallons of a 30% by weight aqueous solution of sodium silicate give good protection. Preferably, the sodium silicate solution may be pumped into the tubing of the well at a rate in the range from about 2 gallons to about 50 gallons per hour and the silicate solution then allowed to remain in contact with the exposed metallic surfaces for a time in the range given before. While 50 to 60 gallons of the concentrated silicate solution will give ample protection to a well 10,000 feet deep, smaller quantities may be required for wells of lesser depth. As little as 10 gallons of the concentrated solution may be used to give adequate protection to wells less than 5,000 feet deep.

As another method of injecting the sodium silicate solution into the well, the silicate solution may be prepared as described, preferably as a concentrated aqueous solution, and "lubricated" into the oil well tubing. This is accomplished by closing the master valve on the well and opening the top valve on the Christmas tree arrangement on the well. The Christmas tree is then completely filled with the alkali metal silicate solution and the top valve then closed and the master valve reopened. Gas pressure is then allowed to displace the Christmas tree contents into the tubing.

In order to illustrate further the beneficial effects of the present invention, the following examples are given. A condensate well in the Pecan Island Field in Louisiana had shown evidence of corrosion of the tubing by a high concentration of iron in the water produced from the well. This well was shut in in a conventional manner and a 30% by weight aqueous solution of sodium silicate was pumped into the tubing as fast as the tubing could take the solution. A total of fifty gallons of the sodium silicate was injected into the well. After allowing the sodium silicate solution to remain in contact with the exposed ferrous metallic surfaces, the well was put back into production for a period of time exceeding six months after which time caliper surveys were made with the usual wire line device to determine whether or not an effective film had been built up on the interior surfaces of the tubing. The caliper survey indicated that an effective film had been built up on the exposed metallic surfaces. Furthermore, an analysis of the water produced with the hydrocarbon product showed that the corrosivity had been substantially eliminated since the water contained substantially little iron salts above that usually encountered in fluids produced in subsurface formations from this area in Louisiana.

In another method of injection, the master valve of a well in the same field in Louisiana in which corrosion had been encountered was closed in and sodium silicate injected thereto through the Christmas tree in the manner described before. The amount of sodium silicate employed was about 50 gallons and was allowed to remain in contact with the corrosive fluids in the well for a time in the range given before, after which production from the well was resumed. Similar beneficial results were obtained with this method of injecting the silicate solution into the well.

It might be mentioned that, in condensate wells, particularly when closed in, the upper part of the well will comprise hydrocarbons, usually gaseous hydrocarbons, followed by a layer of liquid hydrocarbons with water at the bottom of the well. Ordinarily, the ferrous metal surfaces will be wetter preferentially by water. The corrosive material in the well fluids, however, will usually be distributed among the various layers in the well in accordance with the conditions of temperature and pressure obtaining in the well and the distribution coefficients of the corrosive media in the gaseous and liquid layers.

Ordinarily, the treatment of an oil or gas well may be repeated as often as required, depending on the conditions, but usually after initial coating has been obtained, the coating will effectively reduce corrosion of the ferrous metal surfaces in the well for a period of time ranging from 6 to 12 months. It will be seen that such treatment allows the well to remain in production for long periods of time without shutting in for servicing or other repairs.

While the present invention has most application to the treatment of the interior surfaces of tubing, it is not limited to this particular treatment but may be applied equally as well to treatment of the exterior surfaces of the production string or may be applied to treatment of the well casing itself. In short, the present invention is applicable to treatment of ferrous metal conduits in wells exposed to corrosive fluids such as hydrocarbons, water, and the like, containing corrosive media such as carbon dioxide, organic and inorganic acids, salts thereof, hydrogen sulfide, and the like. It is necessary in order to obtain the beneficial results of the present invention to shut in the well to form a static column or head of the corrosive fluid in the well and allow the alkali metal silicate to remain in contact with the exposed ferrous metallic surfaces for a period of time sufficient to allow the exposed surfaces to be cleaned and a film of the protective material to be deposited thereon.

The nature and objects of the present invention having been completely described and illustrated, what I wish to claim as new and useful and to secure by Letters Patent is:

1. A method for preventing corrosion of exposed ferrous metallic surfaces in a well drilled in the earth in contact with corrosive liquids from subsurface formations pierced by said well, which comprises flowing a corrosive liquid in a ferrous metal conduit from a subsurface formation pierced by said well, shutting off the flow of said corrosive liquid in said ferrous metallic conduit to form a static head of said liquid in said conduit, then introducing into said conduit a concentrated aqueous solution of an alkali metal silicate in an amount of approximately 1 gallon for approximately every 167 to 500 feet of said well and sufficient to form a coating of silicate on the exposed surfaces of said conduit, allowing said solution to remain in contact with said exposed surfaces of said conduit for a period of time in the range from 30 minutes to 10 hours thereby forming a silicate coating thereon, and resuming flow of said corrosive liquids in said conduit.

2. A method in accordance with claim 1 in which the alkali metal silicate is potassium silicate.

3. A method in accordance with claim 1 in which the alkali metal silicate is lithium silicate.

4. A method in accordance with claim 1 in which the alkali metal silicate is sodium silicate and the corrosive liquid comprises hydrocarbon, water, and carbon dioxide.

5. A method in accordance with claim 1 in which the concentrated aqueous solution of alkali metal silicate is a 30% by weight aqueous solution of sodium silicate.

RUDOLPH C. BUCHAN.

REFERENCES CITED

The following references are of record in the file of this patent:

UNITED STATES PATENTS

| Number | Name | Date |
|---|---|---|
| 1,531,993 | Speller | Mar. 31, 1925 |
| 1,545,874 | Andrews | July 14, 1925 |
| 1,700,995 | Burns et al. | Feb. 5, 1929 |
| 2,330,145 | Reimers | Sept. 21, 1943 |
| 2,357,559 | Smith | Sept. 5, 1944 |

OTHER REFERENCES

Mills, R. V. A., "Protection of Oil and Gas Field Equipment Against Corrosion," page 82, Department of the Interior, Bureau of Mines, Bulletin 233. Government Printing Office, Washington, 1925.